US008469339B2

(12) United States Patent
Liberato et al.

(10) Patent No.: US 8,469,339 B2
(45) Date of Patent: Jun. 25, 2013

(54) PUSH/PULL TAG LINE

(75) Inventors: Frank Liberato, Portland, TX (US); Paul Liberato, Richmond, TX (US)

(73) Assignee: Billy Pugh Company, Inc., Corpus Christi, TX (US)

( * ) Notice: Subject to any disclaimer, the term of this patent is extended or adjusted under 35 U.S.C. 154(b) by 116 days.

(21) Appl. No.: 12/861,285

(22) Filed: Aug. 23, 2010

(65) Prior Publication Data

US 2012/0043514 A1 Feb. 23, 2012

(51) Int. Cl.

| | |
|---|---|
| ***H02G 1/08*** | (2006.01) |
| ***A01K 29/00*** | (2006.01) |
| ***B65G 7/12*** | (2006.01) |
| ***A44B 13/00*** | (2006.01) |
| ***F16B 45/00*** | (2006.01) |
| *B66F 19/00* | (2006.01) |

(52) U.S. Cl.
USPC .................... 254/134.3 FT; 294/26; 294/1.5; 24/265 H

(58) Field of Classification Search
USPC 254/134.3; 294/26, 1.5, 82.19, 86.42; 24/265 H
See application file for complete search history.

(56) References Cited

U.S. PATENT DOCUMENTS

| | | | | |
|---|---|---|---|---|
| 1,208,624 | A * | 12/1916 | Newman | 119/801 |
| 1,524,761 | A * | 2/1925 | Timbs | 294/82.19 |
| 1,858,997 | A * | 5/1932 | Lewin | 254/134.3 FT |
| 2,367,912 | A | 1/1945 | Westfall | |
| 2,532,828 | A | 12/1950 | Westfall | |
| 2,588,037 | A | 3/1952 | Orton, Sr. | |
| 3,122,806 | A * | 3/1964 | Lewis | 403/220 |
| 3,366,259 | A | 1/1968 | Miller et al. | |
| 3,841,686 | A * | 10/1974 | Gallo et al. | 294/1.4 |
| 4,002,817 | A * | 1/1977 | DeGrado | 174/10 |
| 4,195,872 | A * | 4/1980 | Skaalen et al. | 294/82.19 |
| 4,601,507 | A * | 7/1986 | Fallon | 294/86.42 |
| 5,052,660 | A * | 10/1991 | Bergman | 254/134.3 FT |
| 5,136,756 | A * | 8/1992 | Krauss | 24/265 H |
| 5,546,639 | A * | 8/1996 | Lacore et al. | 24/265 H |
| 5,558,377 | A * | 9/1996 | Blum et al. | 294/210 |
| 5,628,538 | A * | 5/1997 | Ericksen | 294/210 |
| 5,636,888 | A * | 6/1997 | Kiser et al. | 294/82.19 |
| D381,893 | S * | 8/1997 | Klamm | D8/394 |
| D386,052 | S * | 11/1997 | Nasir | D8/14 |
| 5,687,954 | A * | 11/1997 | Schroeder | 254/134.3 FT |
| D403,932 | S * | 1/1999 | Klamm | D8/14 |
| 5,887,855 | A * | 3/1999 | Whitney et al. | 254/134.3 R |
| 5,947,629 | A * | 9/1999 | Anscher | 403/374.5 |
| 6,308,383 | B1 * | 10/2001 | Schrader | 24/265 H |
| 6,416,040 | B1 * | 7/2002 | Bergman | 254/134.3 FT |
| 6,499,778 | B2 * | 12/2002 | Boulay | 294/26 |
| 6,883,782 | B2 * | 4/2005 | Ames et al. | 254/134.3 FT |
| 6,925,791 | B2 * | 8/2005 | Herndon | 56/333 |
| 7,175,160 | B2 * | 2/2007 | Diggle et al. | 254/134.3 FT |
| 7,740,230 | B2 * | 6/2010 | Oberli et al. | 254/134.4 |
| 7,854,455 | B2 * | 12/2010 | Ruscil et al. | 294/1.5 |
| D645,216 | S * | 9/2011 | Silas | D30/162 |
| 8,091,866 | B2 * | 1/2012 | White | 254/134.3 FT |

* cited by examiner

*Primary Examiner* — Lee D Wilson
*Assistant Examiner* — Alvin Grant
(74) *Attorney, Agent, or Firm* — Haynes and Boone, LLP

(57) ABSTRACT

A push/pull tag line includes an elongated rigid member having a first end and a second end located opposite the first end. A flexible member is coupled to the elongated rigid member and extends from the first end of the elongated rigid member. A load connector is coupled to the second end of the elongated rigid member. The tag line may be coupled to a load using the load connector. A pushing force may then be applied to the rigid member that is directed towards the load, and the rigid member will transmit the pushing force to the load to allow precise positioned of the load.

20 Claims, 8 Drawing Sheets

PUSH/PULL TAG LINE

BACKGROUND

The present disclosure relates generally to positioning loads, and more particularly to push/pull tag line system for precisely and safely positioning a load.

Conventional methods for positioning loads typically involve a lifting mechanism such as, for example, a crane, that includes a load support line. A load may be coupled to the load support line and the lifting mechanism may then be used to lift and move the load to a desired location. The positioning of the load once it has been moved into the vicinity of the desired location can raise a number of issues.

Traditionally, tag lines have been used to provide positioning of the load once it has been moved into the vicinity of the desired location. Conventional tag lines include a carabiner attached to a rope. The carabiner is secured to the load, and when the load is moved into the vicinity of the desired location, a user may grab and pull the rope in order to move the load towards the desired location. However, for situations in which precise positioning of the load on the desired location is required, these conventional tag lines provide several disadvantages. For example, the rope only allows a pulling force to be imparted by the user on the rope. If the load is pulled beyond the desired location, the user must either wait for the load to swing back past the desired location, which increases the time needed to position the load, attach an additional tag line to the load to be able to pull the load in an opposite direction, which complicates the positioning of the load, or the user must push directly on the load to move it to the desired location, which increases the risk of injury to the user that is associated with the positioning of the load.

Accordingly, it would be desirable to provide an improved tag line.

SUMMARY

A push/pull tag line includes an elongated rigid member having a first end and a second end located opposite the first end, a flexible member coupled to the elongated rigid member and extending from the first end of the elongated rigid member, and a load connector coupled to the second end of the elongated rigid member.

DETAILED DESCRIPTION

Figure 1A:
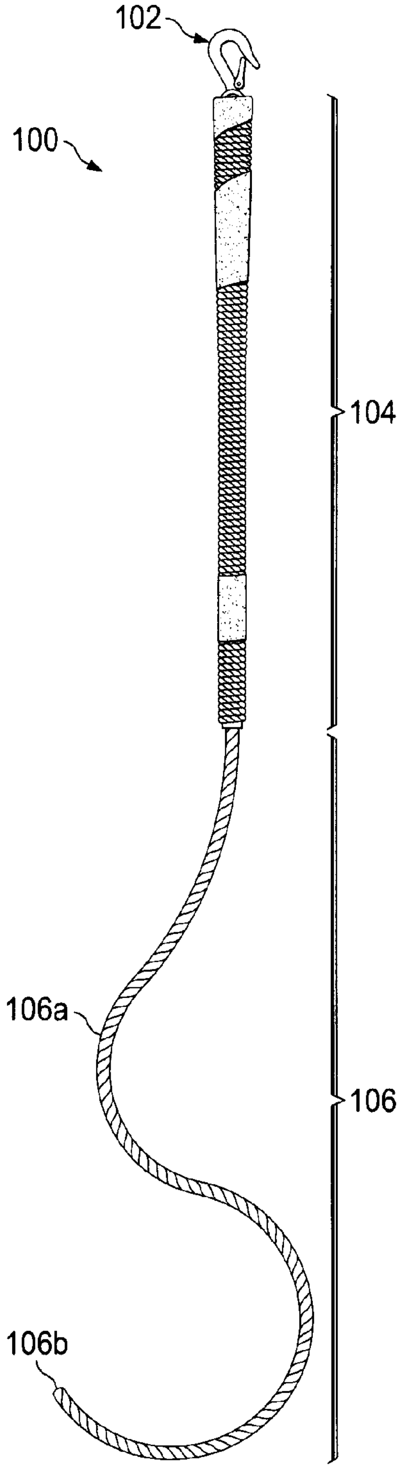
FIG. 1*a* is a side view illustrating an embodiment of a push/pull tag line.
Figure 1B:
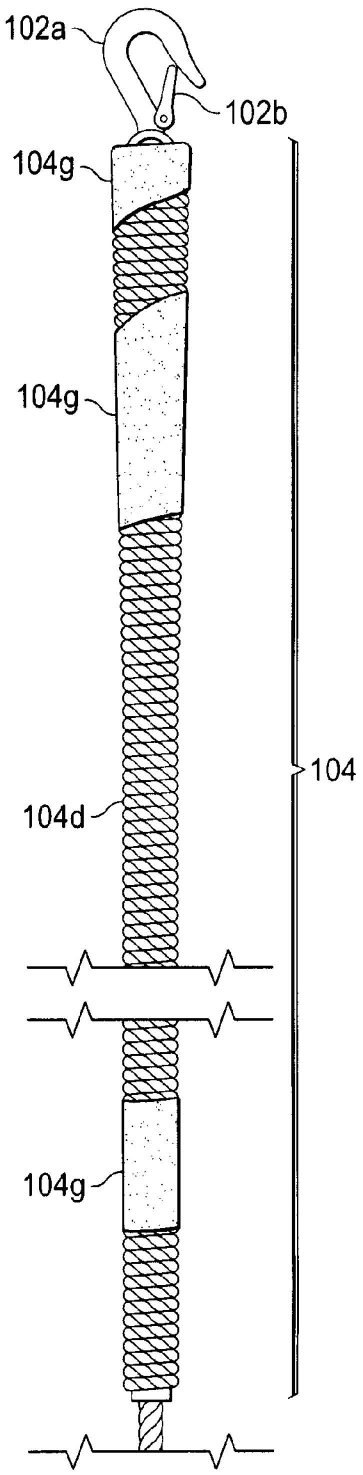
FIG. 1*b* is a side view illustrating an embodiment of the push/pull tag line of FIG. 1*a*.
Figure 1C:
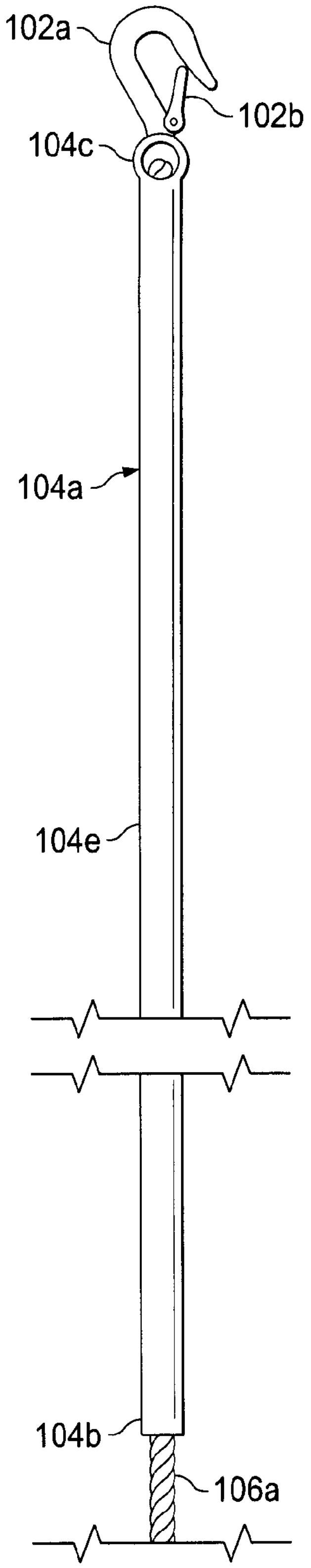
FIG. 1*c* is a side view illustrating an embodiment of the push/pull tag line of FIGS. 1*a* and 1*b* with a rigid member cover removed.
Figure 1D:
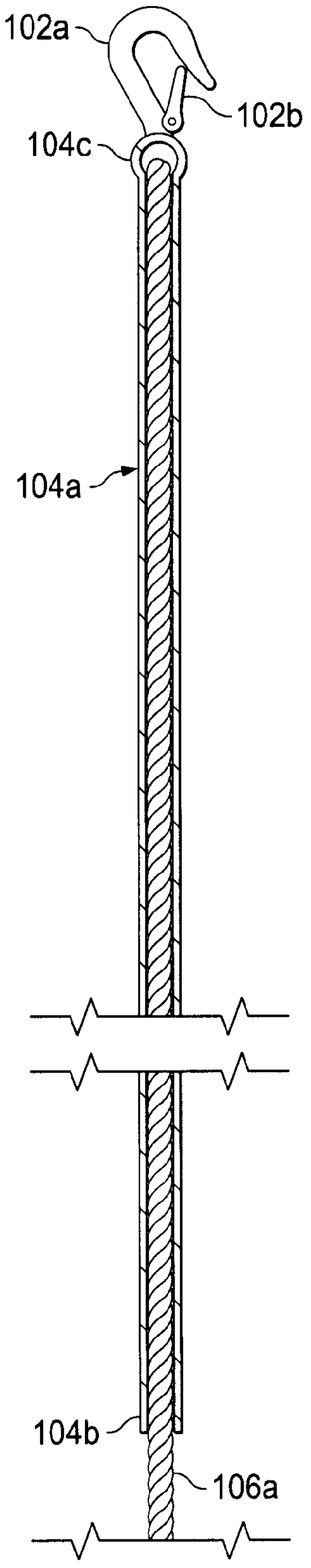
FIG. 1*d* is a partial cross-sectional view illustrating an embodiment of the push/pull tag line of FIG. 1*c*.
Figure 1E:
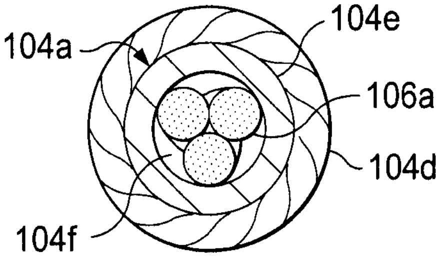
FIG. 1*e* is a cross sectional view illustrating an embodiment of the push/pull tag line of FIGS. 1*a*, 1*b*, 1*c*, and 1*e*.

Referring first to FIGS. 1*a*, 1*b*, 1*c*, 1*d*, and 1*e*, a push/pull tag line 100 is illustrated. The push/pull tag line 100 includes a load connector 102 that is coupled to a rigid section 104, and a flexible section 106 that extends from the rigid section 104. In an embodiment, the load connector 102 includes a load coupling member 102*a* and a load securing member 102*b* that is moveably coupled to the load coupling member 102. In the illustrated embodiment, the load coupling member 102*a* and the load securing member 102*b* of the load connector 102 provide a snap-hook that allows the push/pull tag line 100 to be quickly and easily connected and secured to a load, as will be explained in further detail below. While a specific load connector 102 has been described and illustrated, one of skill in the art will recognize that a variety of load connectors having different structure and functionality may be substituted without departing from the scope of the present disclosure.

In an embodiment, the rigid section 104 includes an elongated rigid member 104*a* having a first end 104*b* and a second end 104*c* located opposite the first end 104*b*, and a rigid member cover 104*d* that engages an outer surface 104*e* of the elongated rigid member 104*a*. In the illustrated embodiment, the elongated rigid member 104*a* is an elongated rigid tubular member that defines a passageway 104*f* extending along the length of the elongated rigid member 104*a*, and the rigid member cover 104*d* includes a rope. In an embodiment, the elongated rigid tubular member 104*a* may be a 3/16 inch stainless steel type-304 rod. In an embodiment, the elongated rigid tubular member 104*a* may be a fiberglass rod. In an embodiment, the elongated rigid tubular member 104*a* may be a Poly Vinyl Chloride (PVC) pipe. Thus, elongated rigid member 104*a* may be fabricated from a variety of materials as long as the structure of the elongated rigid member 104*a* is rigid and not flexible such that the elongated rigid member 104*a* will transmit a force that is applied to the elongated rigid member 104*a* in any direction, described in further detail below. In an embodiment, the rigid member cover 104*d* may be a 5/16 inch diameter 3 strand twisted nylon rope that includes heat shrink wrapped sections 104*g*. In an embodiment, the rigid member cover 104*d* is a rope that is wrapped around the elongated rigid member 104*a* in a substantially perpendicular orientation relative to the longitudinal axis of the push/pull tag line 100 in order to provide better grip on the push/pull tag line 100 for a user. In the illustrated embodiment, the load connector 102 is rigidly mounted to the second end 104*c* of the elongated rigid member 104*a* by, for example, a weld and/or other rigid mounting means known in the art.

In an embodiment, the flexible section 106 includes a flexible member 106*a* that is secured to the elongated rigid member 104*a* and extends through the passageway 104*f* defined by the elongated rigid member 104*a* and out of the elongated rigid member 104*a* from the first end 104*b*. In an embodiment, the flexible member 106*a* may be a ⅝ inch diameter polyester and ultra blue fiber rope. In an embodiment, the flexible member 106*a* may be a nylon rope. In an embodiment, the flexible member 106*a* may be a polydacron rope. Thus, the flexible member 106*a* may be fabricated from a variety of material as long as the structure of the flexible member 106*a* is flexible. In an embodiment, an outer layer of smaller diameter rope may be wrapped around the flexible member 106*a* in order to resist the flexible member 106*a* from turning on itself and wrapping around objects. In an embodiment, the flexible member 106*a* has no knots or raised surfaces. In an embodiment, the flexible member 106*a* has been dipped in polyurethane in order to, for example, increase the resistance of the flexible member 106 to ultraviolet radiation, toughen the flexible member 106*a*, and/or a variety of other benefits known in the art.

In an embodiment, the rigid section 104 of the push/pull tag line 100 may be approximately 4 feet long, while the flexible member 106*a* that makes up the flexible section 106 of the push/pull tag line 100 may be approximately 10-15 feet measured from a point on the flexible member 106*a* immediately adjacent the first end 104*b* of the elongated rigid member 104*a* to the distal end 106*b* of the flexible member 106*a* that is part of the flexible section 106 of the push/pull tag line 100. However, one of skill in the art will recognize that the dimensions of the rigid section 104 and the flexible section 106 may be modified from those disclosed above without departing from the scope of the present disclosure.

Figure 2A:
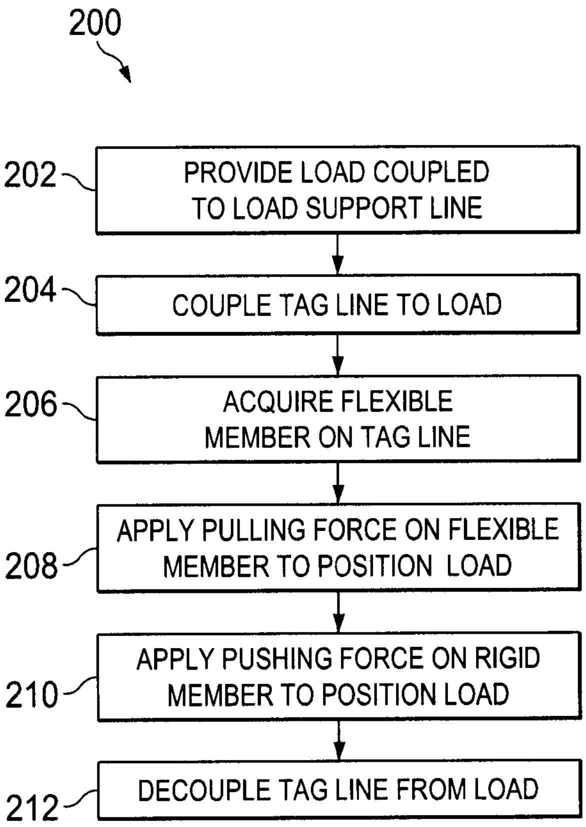
FIG. 2*a* is a flow chart illustrating an embodiment of a method for positioning a load.
Figure 2B:
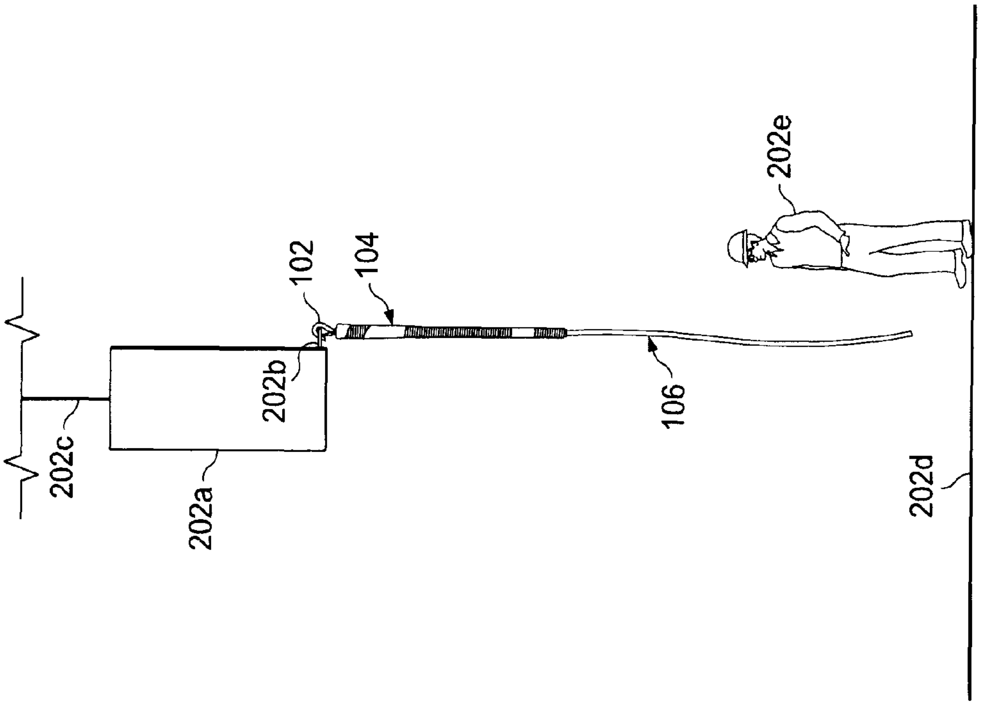
FIG. 2*b* is a side view illustrating an embodiment of a load being lifted with the push/pull tag line of FIGS. 1*a*, 1*b*, 1*c*, 1*d*, and 1*e* coupled to the load.
Figure 2C:
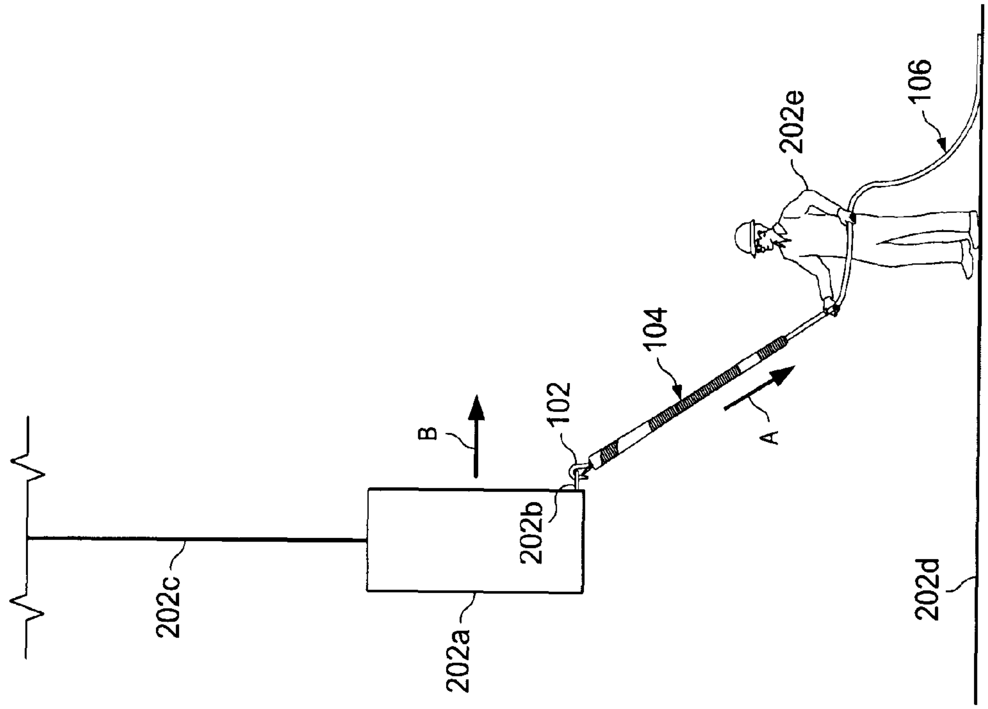
FIG. 2*c* is a side view illustrating an embodiment of the load of FIG. 2*b* being positioned by a user using a flexible member on the push/pull tag line of FIGS. 1*a*, 1*b*, 1*c*, 1*d*, and 1*e*.

Referring now to FIGS. 1*a*, 1*b*, 2*a*, 2*b*, and 2*c*, a method 200 for positioning a load is illustrated. The method 200 begins at block 202 where a load coupled to a load support line is provided. A load 202*a* that includes a tag line coupling 202*b* and that is coupled to a load support line 202*c* is provided. In an embodiment, the load support line 202*c* may be coupled to a lifting mechanism such as, for example, a crane and/or other lifting mechanism known in the art, in order to facilitate the positioning of the load 202*a* at a load destination 202*d* by a user 202*e*. The method 200 then proceeds to block 204 where a tag line is coupled to the load. In an embodiment, the push/pull tag line 100 is coupled to the load 202*a* by attaching the load connector 102 to the tag line coupling 202*b* using the load coupling member 102*a* and securing the load connector 102 to the tag line coupling 202*b* using the load securing member 102*b*. The load 202*a* may then be lifted using the load support line 202*c*. With the push/pull tag line 100 coupled to the load 202*a* during the lifting of the load 202*a*, the push/pull tag line 100 hangs from the load 202*a* due to the force of gravity, as illustrated in FIG. 2*b*. The method 200 then proceeds to block 206 where the flexible member on the tag line is acquired. As the load 202*a* is lowered towards the load destination 202*d* using the load support line 202*c*, the user 202*e* may acquire the distal end 106*b* of the flexible member 106*a* in order to gain control of and acquire the flexible member 106*a*, as illustrated in FIG. 2*c*.

Figure 2E:
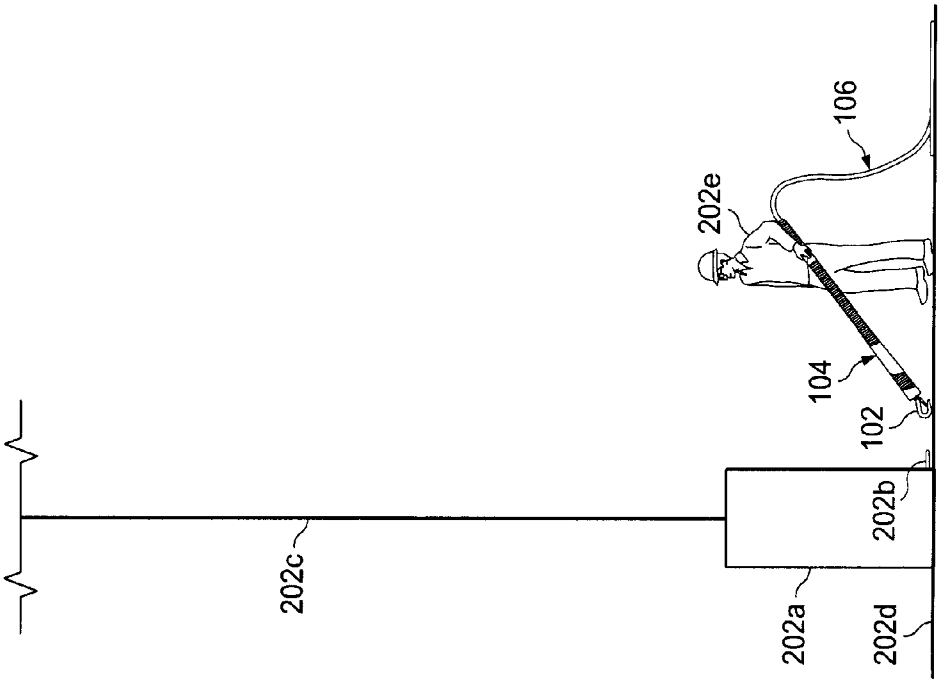
FIG. 2*e* is a side view illustrating an embodiment of the load of FIGS. 2*b*, 2*c*, and 2*d* with the push/pull tag line of FIGS. 1*a*, 1*b*, 1*c*, 1*d*, and 1*e* decoupled from the load.
Figure 2D:
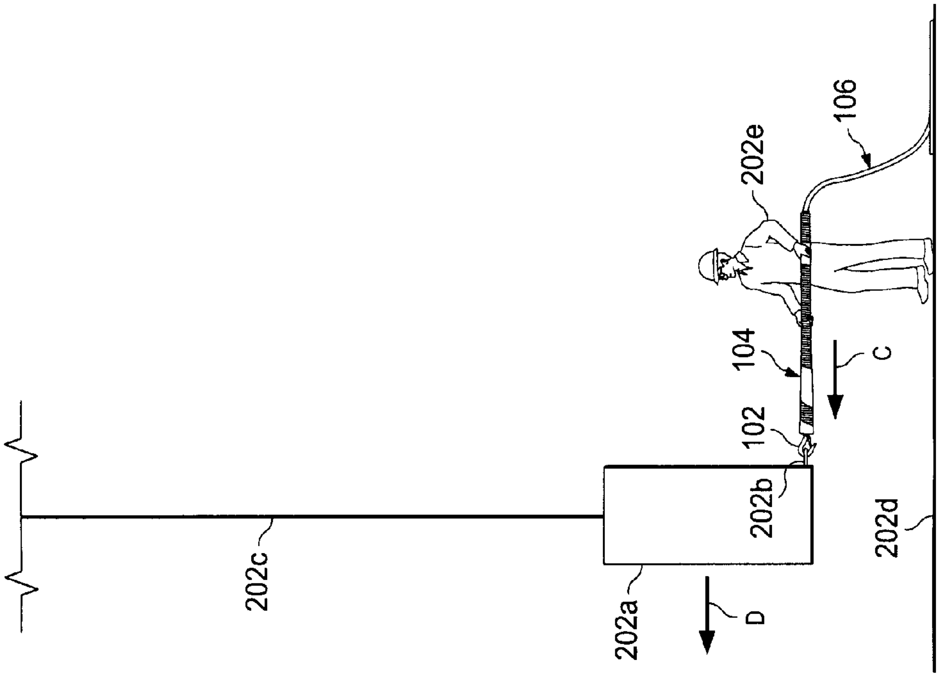
FIG. 2*d* is a side view illustrating an embodiment of the load of FIG. 2*c* being positioned by the user using an elongated rigid member on the push/pull tag line of FIGS. 1*a*, 1*b*, 1*c*, 1*d*, and 1*e*.

Referring now to FIGS. 1*a*, 1*b*, 1*c*, 2*a*, 2*c*, and 2*d*, the method 200 then proceeds to block 208 where a pulling force is applied on the flexible member to position the load. Upon acquiring the flexible member 106*a*, the user 202*e* may then position the load 202*a* by applying a pulling force A to the flexible member 106*a* that is directed away from the load 202*a*, and the pulling force A will be transmitted through the push/pull tag line 100 to the load 202*a* to move the load 202*a* in a direction B and position the load 202*a* adjacent the load destination 202*d*. However, in the event the pulling force A is too great, applied for too long, etc., the load 202*a* may move too far in the direction B and may not be positioned appropriately adjacent the load destination 202*d*. The method 200 may then proceed to block 210 where a pushing force is applied on the rigid member to position the load. As the load 202*a* is lowered further using the load support line 202*c* from the position illustrated in FIG. 2*c*, the user 202*e* may use the flexible member 106*a* to acquire the rigid member 104*a*, as illustrated in FIG. 2*d*. In acquiring the elongated rigid member 104*a*, the user 202*e* may choose to grip the elongated rigid member 104*a* adjacent the first end 104*b* in order to be positioned as far as possible from the load 202*a* in order to lessen the risk of injury while safely positioning the load 202*a* using the elongated rigid member 104*a*. The user 202*e* may then apply a pushing force C that is directed towards the load 202*a*, and the pushing force C will be transmitted through the elongated rigid member 104*a* to the load 202*a* to move the load 202*a* in a direction D to position the load 202*a* adjacent the load destination 202*d*. Furthermore, the user 202*e* may apply a pulling force to the elongated rigid member 104*a* that is directed opposite the pushing force C and away from the load 202*a*, and that pulling force will be transmitted through the elongated rigid member 104*a* to the load 202*a* to move the load 202*a* in a direction opposite the direction D and position the load 202*a* adjacent the load destination 202*d*. Also, other forces may be applied to the elongated rigid member 104*a* and transmitted through the elongated rigid member 104*a* to the load 202*a* to move the load 202*a* in any direction the user 202*e* desires in order to position the load 202*a* adjacent the load destination 202*d* such that the load 202*a* may be positioned on the load destination 202*d*, as illustrated in FIG. 2*e*.

Thus, as the load 202*a* is moved in the vicinity of the load destination 202*e*, the elongated rigid member 104*a* allows the user 202*e* to position the load 202*a* by applying a variety of forces to the elongated rigid member 104*a* in order to move the load 202*a* in a variety of directions without the user 202*e* having to physically touch the load 202*a*, which allows precise positioning of the load 202*a* while decreasing the safety risk to the user 202*e* associated with positioning the load 202*a*. The dimensions of the rigid section 104 and the flexible section 106 on the push/pull tag line 100 may be varied according to application in order to ensure that a user will be able to acquire the push/pull tag line 100 using the flexible section 106 at an appropriate time during the moving of the load, and then precisely position the load using the rigid section 104 while remaining far enough away from the load to ensure the users safety. The method 200 then proceeds to block 212 where the tag line is decoupled from the load. The push/pull tag line 100 may be unsecured from the load 202*a* using the load securing member 102*b* and decoupled the from the load 202*a* by decoupling the load coupling member 102*a* from the tag line coupling 202*b*, as illustrated in FIG. 2*e*.

Figure 3A:
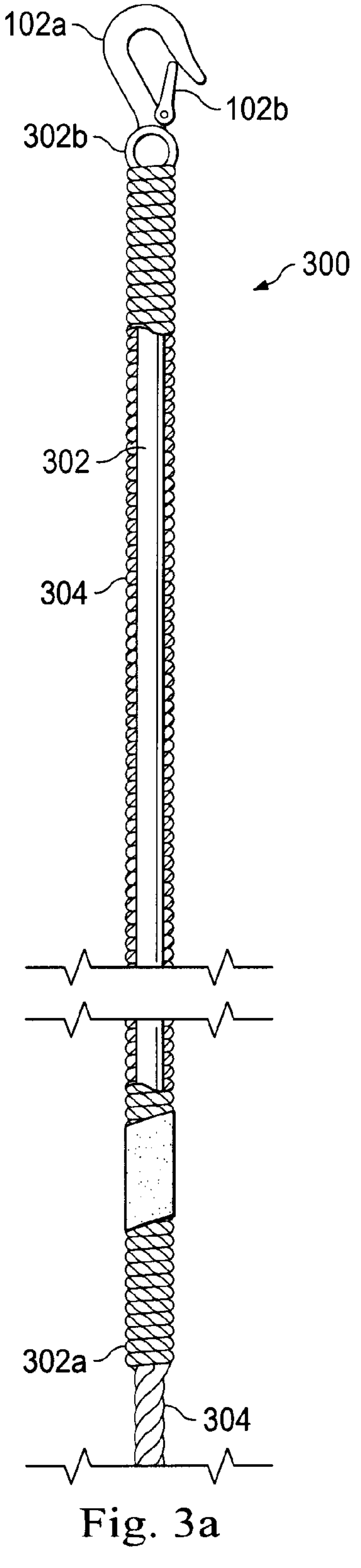
FIG. 3*a* is a partial cross-sectional view illustrating an embodiment of a push/pull tag line.
Figure 3B:
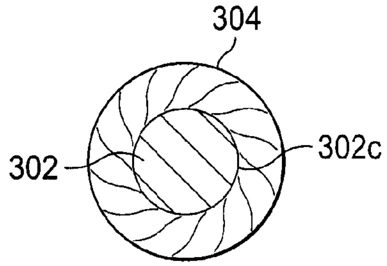
FIG. 3*b* is a cross-sectional view illustrating an embodiment of the push/pull tag line of FIG. 3*a*.

Referring now to FIGS. 3*a* and 3*b*, a push/pull tag line 300 is illustrated that is substantially similar in structure and operation to the push/pull tag line 100 described above with reference to FIGS. 1*a*, 1*b*, 1*c*, 1*d*, 1*e*, 2*a*, 2*b*, 2*c*, 2*d*, and 2*e*, with the provision of a modified elongated rigid member 302 and flexible member 304. In the illustrated embodiment, the elongated rigid member 302 is an elongated rigid solid member that includes a first end 302*a*, a second end 302*b* and an outer surface 302*c*. The load coupling member 102*a* and the load securing member 102*b* are rigidly mounted to the second end 302*b* of the elongated rigid member 302. The flexible member 304 is secured to the elongated rigid member 302, engages the outer surface 302*c* of the elongated rigid member 302, and extends from the first end 302*a* of the elongated rigid member 302. The push/pull tag line 300 is operable in the same manner as described above for the push/pull tag line 100 according to the method 200.

Figure 4:
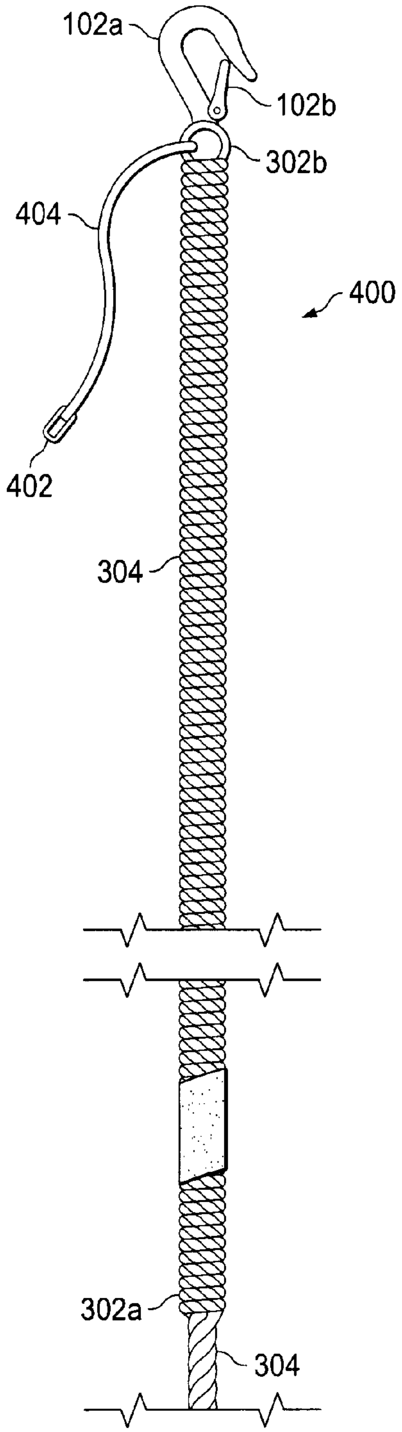
FIG. 4 is a side view illustrating an embodiment of a push/pull tag line.

Referring now to FIG. 4, a push/pull tag line 400 is illustrated that is substantially similar in structure and operation to the push/pull tag line 300 described above with reference to FIGS. 3*a* and 3*b*, with the provision of secondary load coupling member 402 that is coupled to the second end 302*b* of the rigid member 302 by a secondary flexible member 404. In an embodiment, the push/pull tag line 400 is operable in the same manner as described above for the push/pull tag line 100 according to the method 200, with the provision that the secondary load coupling member 402 may be coupled to the load 202*a* to provide a redundant connection for the push/pull tag line 400 to the load 202*a*.

Figure 5:
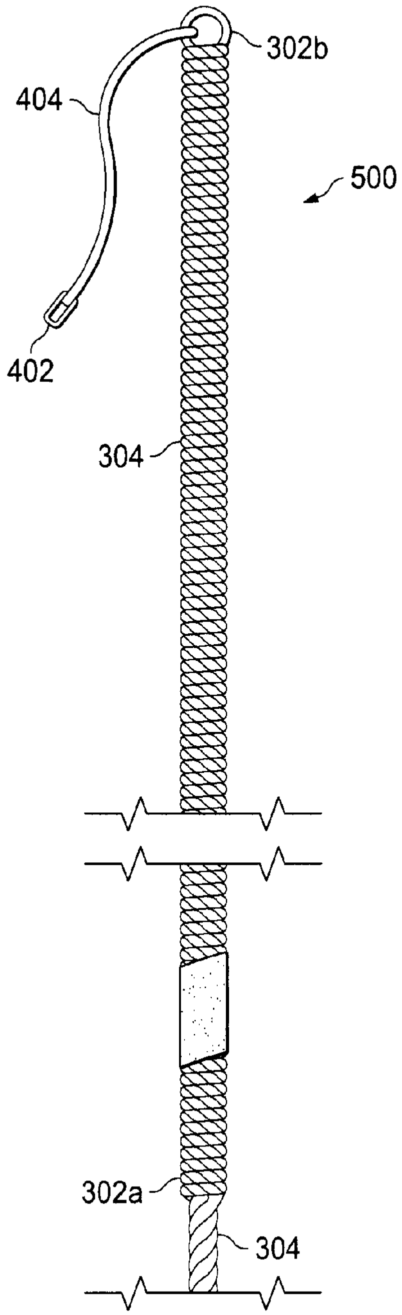
FIG. 5 is a side view illustrating an embodiment of a push/pull tag line.

Referring now to FIG. 5, a push/pull tag line 500 is illustrated that is substantially similar in structure and operation to the push/pull tag line 400 described above with reference to FIG. 4, with the removal of the load coupling member 102*a* and the load securing member 102*b*. In an embodiment, the push/pull tag line 500 is operable in the same manner as described above for the push/pull tag line 100 according to the method 200, with the provision that the secondary load coupling member 402 may be coupled to the load 202*a* in the manner described for the load connector 102.

Figure 6:
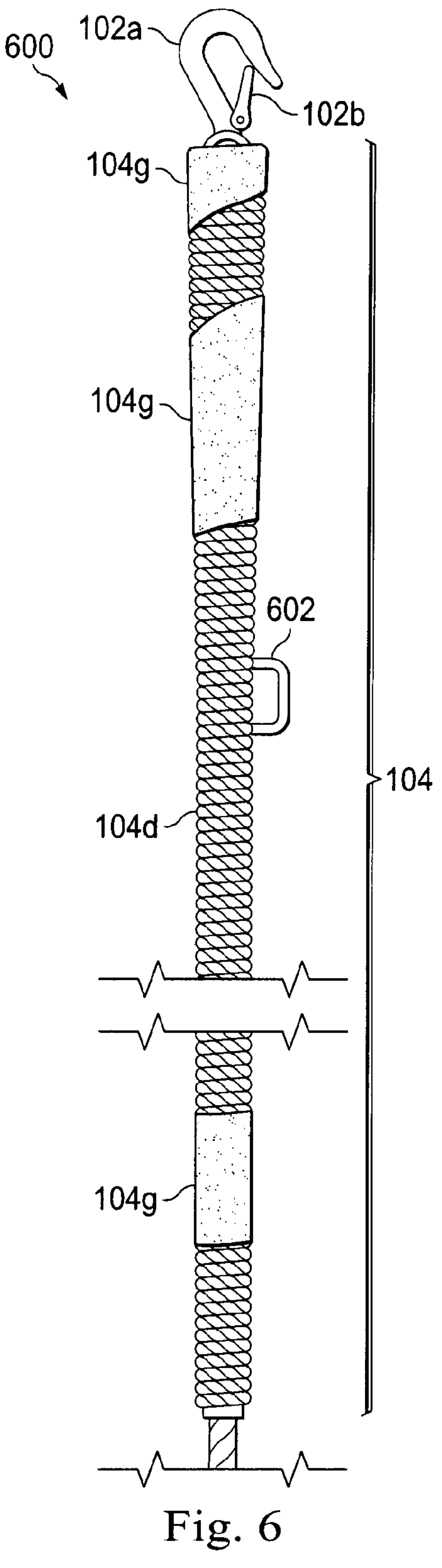
FIG. 6 is a side view illustrating an embodiment of a push/pull tag line.

Referring now to FIG. 6, a push/pull tag line 600 is illustrated that is substantially similar in structure and operation to the push/pull tag line 100 described above with reference to FIGS. 1*a*, 1*b*, 1*c*, 1*d*, 1*e*, 2*a*, 2*b*, 2*c*, 2*d*, and 2*e*, with the provision of a handle 602 that extends from the rigid section 104. In an embodiment, the handle 602 may extend from the rigid member 104*a*. In another embodiment, the handle 602 may extend from the rigid member cover 104*d*. The push/pull tag line 600 is operable in the same manner as described above for the push/pull tag line 100 according to the method 200, with the provision that the handle 602 may be used to precisely position the load 202*a*.

Figure 7:
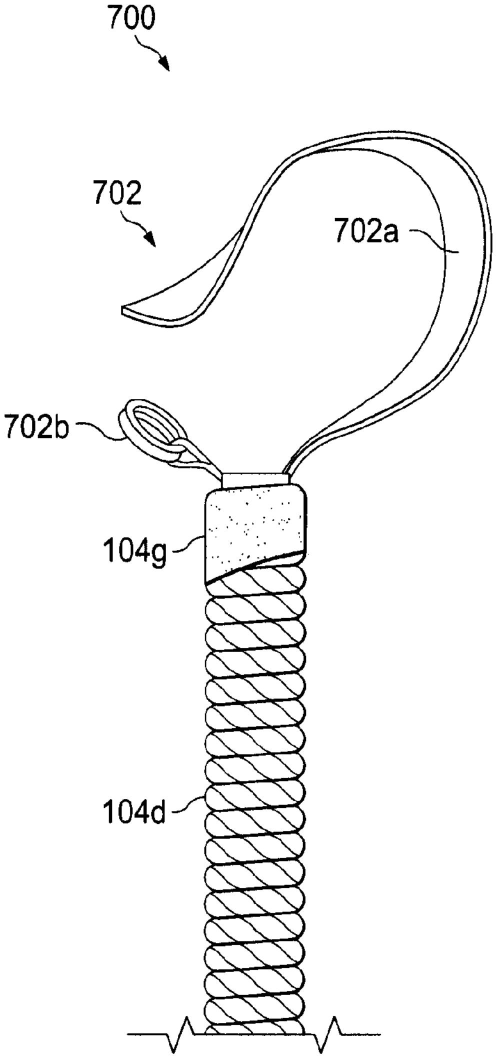
FIG. 7 is a perspective view illustrating an embodiment of a load connector on a push/pull tag line.

Referring now to FIG. 7, a push/pull tag line 700 is illustrated that is substantially similar in structure and operation to the push/pull tag line 100 described above with reference to FIGS. 1*a*, 1*b*, 1*c*, 1*d*, 1*e*, 2*a*, 2*b*, 2*c*, 2*d*, and 2*e*, with the provision of a modified load connector 702 replacing the load connector 102. The modified load connector 702 includes a load coupling member 702*a* and a load securing member 702*b*. In the illustrated embodiment, the load coupling member 102*a* and the load securing member 102*b* of the load connector 102 provide a strap and rings connector that allow the load connector 702 to be secured to a load using methods known in the art. The push/pull tag line 700 is operable in the same manner as described above for the push/pull tag line 100 according to the method 200, with the provision that the load connector 702 is coupled to the load 202*a* in place of the load connector 102.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A push/pull tag line, comprising:

an elongated rigid metal member having a proximal end and a distal end that is located opposite the elongated rigid metal member from the proximal end, wherein the elongated rigid metal member has a rigid member length of at least 2.5 feet between the proximal end and the distal end;

a rigid member cover rope wrapped around the elongated rigid metal member in a substantially perpendicular orientation relative to a rigid member longitudinal axis that is located along the rigid member length, wherein at least one section of the rigid member cover rope includes a heat shrink wrap;

a flexible rope member coupled to the elongated rigid metal member and extending from the proximal end of the elongated rigid metal member, wherein the flexible rope member has a diameter of at least ⅝ of an inch and a length that is at least equal to the length of the elongated rigid metal member; and a load connector coupled to the distal end of the elongated rigid metal member, wherein the load connector includes a rigid curved load coupling member that defines a channel and that is operable to couple to a tag line coupling on a load by positioning the tag line coupling in the channel such that the rigid curved load coupling member engages the tag line coupling.

2. The tag line of claim 1, wherein the elongated rigid metal member comprises an elongated rigid tubular metal member, and wherein at least a portion of the flexible rope member is located within the elongated rigid tubular metal member.

3. The tag line of claim 1, wherein the elongated rigid member comprises an elongated rigid solid metal member, and wherein at least a portion of the flexible rope member engages an outer surface of the elongated rigid solid metal member.

4. The tag line of claim 1, wherein the rigid member cover rope extends at least from the proximal end of the elongated rigid metal member to the distal end of the elongated rigid metal member.

5. The tag line of claim 1, wherein the rigid member cover rope includes a diameter of at least 5/16 of an inch.

6. The tag line of claim 1, wherein the length of the flexible rope member is at least double the length of the elongated rigid metal member.

7. The tag line of claim 1, further comprising:

a handle extending from the elongated rigid metal member between the proximal end of the elongated rigid metal member and the distal end of the elongated rigid metal member.

8. The tag line of claim 1, wherein the load connector comprises the rigid curved load coupling member and a load securing member that is moveable relative to the rigid curved load coupling member to allow the tag line coupling to enter the channel and to prevent the tag line coupling from leaving the channel after being positioned in the channel.

9. A push/pull tag line system, comprising:

a load support line;

a load coupled to the load support line; and a push/pull tag line coupled to the load, the push/pull tag line comprising:

a load connector coupled to the load, wherein the load connector includes a rigid curved load coupling member that defines a channel, and wherein a portion of the load is positioned in the channel such that the rigid curved load coupling member engages the load to couple the push/pull tag line to the load;

an elongated rigid metal member having a proximal end and a distal end located opposite the elongated rigid metal member from proximal end, wherein the elongated rigid metal member has a rigid member length of at least 2.5 feet between the proximal end and the distal end end, and wherein the load connector is coupled to the distal end;

a rigid member cover rope wrapped around the elongated rigid metal member in a substantially perpendicular orientation relative to a rigid member longitudinal axis that is located along the rigid member length, wherein at least one section of the rigid member cover rope includes a heat shrink wrap; and a flexible rope member coupled to the elongated rigid metal member and extending from the proximal end of the elongated rigid metal member, wherein the flexible rope member has a diameter of at least ⅝ of an inch and a length that is at least equal to the length of the elongated rigid metal member.

10. The system of claim 9, wherein the elongated rigid metal member comprises an elongated rigid tubular metal member, and wherein at least a portion of the flexible rope member is located within the elongated rigid tubular metal member.

11. The system of claim 9, wherein the elongated rigid metal member comprises an elongated rigid solid metal member, and wherein at least a portion of the flexible rope member engages an outer surface of the elongated rigid solid metal member.

12. The system of claim 9, wherein the rigid member cover rope extends at least from the proximal end of the elongated rigid metal member to the distal end of the elongated rigid metal member.

13. The system of claim 9, wherein the rigid member cover rope includes a diameter of at least 5/16 of an inch.

14. The system of claim 9, wherein the length of the flexible rope member is at least double the length of the elongated rigid metal member.

15. The system of claim 9, further comprising:

a handle extending from the elongated rigid metal member between the proximal end of the elongated rigid metal member and the distal end of the elongated rigid metal member.

16. The system of claim 9, wherein the load connector comprises the rigid curved load coupling member and a load securing member that is moveable relative to the rigid curved load coupling member to allow the portion of the load to enter the channel and to prevent the portion of the load from leaving the channel after being positioned in the channel.

17. A method for positioning a load, comprising:

providing a load that is coupled to a load support line;

coupling a tag line to the load, wherein the tag line includes:

a load connector having a rigid curved load coupling member that defines a channel in which a portion of the load is located in order to engage the load with the rigid curved load coupling member and couple the tag line to the load;

an elongated rigid metal member that has a rigid member length of at least 2.5 feet and that is coupled on a distal end to the load connector;

a rigid member cover rope wrapped around the elongated rigid metal member in a substantially perpendicular orientation relative to a rigid member longitudinal axis that is located along the rigid member length, wherein at least one section of the rigid member cover rope includes a heat shrink wrap; and a flexible rope member that includes a length that is at least equal to the length of the elongated rigid metal member and that extends from a proximal end of the elongated rigid metal member that is opposite the distal end;

acquiring the flexible rope member;

using the flexible rope member to acquire the elongated rigid metal member including the rigid member cover rope; and positioning the load by applying a pushing force to the elongated rigid metal member through the rigid member cover rope that is directed towards the load.

18. The method of claim 17, wherein the coupling the tag line to the load further comprises:

securing the portion of the load in the channel by moving a load securing member on the load connector relative to the rigid curved load coupling member, positioning the portion of the load into the channel, and then moving the load securing member relative to the rigid curved load coupling member such that the load securing member is positioned to prevent the portion of the load from leaving the channel.

19. The method of claim 17, further comprising:

positioning the load by applying a pulling force to the flexible rope member that is directed away from the load.

20. The method of claim 18, further comprising:

decoupling the tag line from the load by moving the load securing member relative to the rigid curved load coupling member such that the load securing member does not prevent the portion of the load from leaving the channel; and removing the portion of the load from the channel.

* * * * *